United States Patent [19]
Klein et al.

[11] Patent Number: 5,882,771
[45] Date of Patent: *Mar. 16, 1999

[54] CONFORMABLE EMBOSSABLE RETROREFLECTIVE SHEETING

[75] Inventors: Deana A. Klein, Maplewood; Carol-Lynn Spawn, West Lakeland Township, both of Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 629,495

[22] Filed: Apr. 10, 1996

[51] Int. Cl.⁶ .............. B32B 5/16; B32B 15/08; B32B 27/40; G02B 5/128
[52] U.S. Cl. .......... 428/161; 428/172; 428/187; 428/206; 428/209; 428/210; 428/423.1; 428/424.2; 428/424.4; 428/424.8; 428/425.6; 428/502; 428/913; 428/913.3; 428/914; 427/163.4; 427/180; 427/202; 427/203; 359/529; 359/534; 359/535; 359/536; 359/538; 359/540; 359/541
[58] Field of Search .............. 428/206, 209, 428/210, 323, 325, 343, 344, 423.1, 424.2, 424.4, 424.8, 425.6, 913, 913.3, 914, 524, 501, 502, 504, 505, 425.3, 172, 460, 161; 362/83.1, 83.2; 427/180, 202, 203, 204, 372.2, 163.4, 384, 385.5, 393.5, 407.1, 407.2; 359/529, 534, 535, 536, 538, 539, 540, 541

[56] References Cited

U.S. PATENT DOCUMENTS

| | | | |
|---|---|---|---|
| 2,407,680 | 9/1946 | Palmquist et al. | 88/82 |
| 3,222,204 | 12/1965 | Weber et al. | 117/27 |
| 3,551,025 | 12/1970 | Bingham et al. | 350/105 |
| 3,700,305 | 10/1972 | Bingham | 350/105 |
| 3,795,435 | 3/1974 | Schwab | 350/105 |
| 3,954,899 | 5/1976 | Chang et al. | 260/849 |
| 4,367,920 | 1/1983 | Tung et al. | 350/105 |

(List continued on next page.)

FOREIGN PATENT DOCUMENTS

| | | |
|---|---|---|
| 0 223 565 A2 | 5/1987 | European Pat. Off. . |
| 0 360 420 A2 | 3/1990 | European Pat. Off. . |
| 0 672 921 A2 | 9/1995 | European Pat. Off. . |

OTHER PUBLICATIONS

"Resimene Amino Crosslinker Resins. Properties & Uses for Surface Coatings," Monsanto Co., Pub. No. 2026515, pp. 1–30 (1995).

Ullmann's Encyclopedia of Industrial Chemistry; Fifth, Completely Revised Edition, vol. A2; W. Gerhartz, Ed.; p. 136.

"Standard Test Methods for Polyurethane Raw Materials: Determination of Acid and Alkalinity Numbers of Polyols," American Society for Testing and Materials, Designation: D 4662–93, 139–140 (Aug. 1993).

"Standard Test Method for Resistance of Organic Coatings to the Effects of Rapid Deformation (Impact)," American Society for Testing and Materials, Designation: D 2794–84, 513–515 (Nov. 1984).

(List continued on next page.)

Primary Examiner—Vivian Chen
Attorney, Agent, or Firm—Karl G. Hanson; David R. Cleveland

[57] ABSTRACT

The present invention provides a retroreflective sheeting including: optical elements arranged in substantially a monolayer; a spacing layer in which the optical elements are at least partially embedded; a specularly reflecting layer underlying the spacing layer; and a bead bond layer in which the optical elements are at least partially embedded. The bead bond layer includes an aminoplast-crosslinked polymer comprising urethane groups, wherein prior to crosslinking the polymer has a glass transition temperature (Tg) of less than about 0° C.

43 Claims, 1 Drawing Sheet

U.S. PATENT DOCUMENTS

| | | | |
|---|---|---|---|
| 4,495,061 | 1/1985 | Mayer et al. | 208/89 |
| 4,505,967 | 3/1985 | Bailey | 428/164 |
| 4,511,210 | 4/1985 | Tung et al. | 350/105 |
| 4,530,859 | 7/1985 | Grunzinger, Jr. | 427/385.5 |
| 4,569,857 | 2/1986 | Tung et al. | 427/163 |
| 4,634,220 | 1/1987 | Hockert et al. | 350/167 |
| 4,648,932 | 3/1987 | Bailey | 156/276 |
| 4,663,213 | 5/1987 | Bailey et al. | 428/204 |
| 4,664,966 | 5/1987 | Bailey et al. | 428/203 |
| 4,688,894 | 8/1987 | Hockert | 350/105 |
| 4,721,649 | 1/1988 | Belisle et al. | 428/325 |
| 4,725,494 | 2/1988 | Belisle et al. | 428/325 |
| 4,767,659 | 8/1988 | Bailey et al. | 428/203 |
| 4,808,471 | 2/1989 | Grunzinger | 428/325 |
| 4,896,943 | 1/1990 | Tolliver | 350/105 |
| 4,897,136 | 1/1990 | Bailey et al. | 156/145 |
| 4,919,741 | 4/1990 | Chirhart et al. | 156/223 |
| 4,950,525 | 8/1990 | Bailey | 428/164 |
| 4,983,436 | 1/1991 | Bailey et al. | 428/40 |
| 5,008,142 | 4/1991 | Wilson et al. | 428/203 |
| 5,064,272 | 11/1991 | Bailey et al. | 359/541 |
| 5,069,964 | 12/1991 | Tolliver et al. | 428/325 |
| 5,256,721 | 10/1993 | Wilson et al. | 524/539 |
| 5,262,225 | 11/1993 | Wilson et al. | 428/203 |

OTHER PUBLICATIONS

"Standard Test Methods for Tensile Properties of Thin Plastic Sheeting," *American Society for Testing and Materials*, Designation: D 882–83, 454–465 (Oct. 1983).

J.H. Saunders et al., "Prepolymers" in *Polyurethanes, Chemistry and Technology Part II*; Interscience; New York; pp. 8–49 (1964).

E.N. Doyle in *The development and Use of Polyurethane Products*; McGraw–Hill: New York (1971)—Title Page, Copyright Page, and Table of Contents only.

"Crosslinking," Encyclopedia of Polymer Science and Engineering, vol. 4, pp. 370–374, 1986.

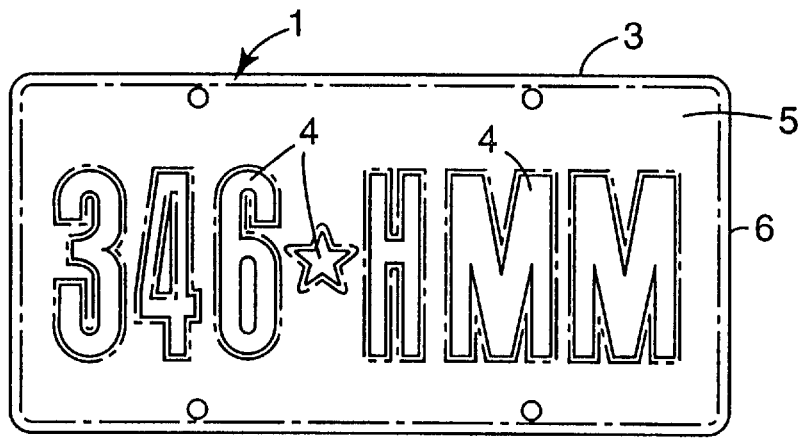
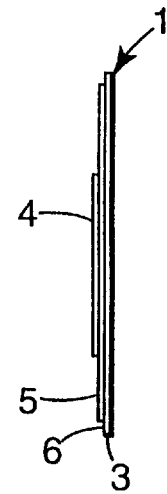
Fig. 1
Fig. 2
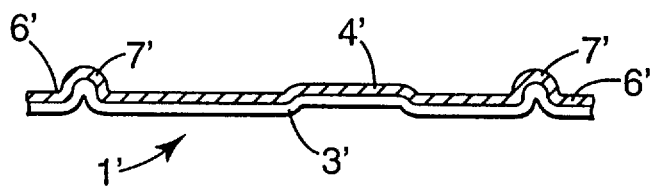
Fig. 3
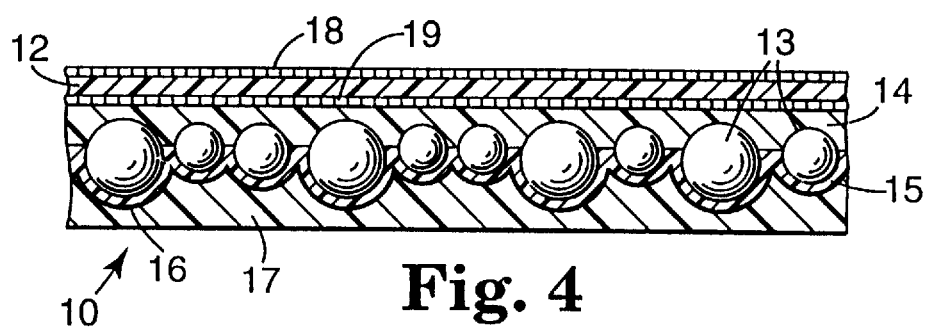
Fig. 4

CONFORMABLE EMBOSSABLE RETROREFLECTIVE SHEETING

FIELD OF THE INVENTION

This invention relates to retroreflective sheeting constructions comprising optical elements partially embedded in a bead bond layer.

BACKGROUND OF THE INVENTION

Heretofore, a number of retroreflective sheeting products have been marketed. A typical example is characterized by a single layer of tiny optical elements embedded in a polymeric bead bond layer and in a polymeric spacing layer. The spacing layer is typically backed by a specularly reflective layer and an adhesive with a strippable protective layer (i.e., a release liner). The bead bond layer is typically surfaced with a top film. Retroreflective sheetings such as this are known as "embedded" lens sheeting (or often as "enclosed" lens sheeting). The first example of an embedded-lens sheeting was taught by U.S. Pat. No. 2,407,680 (Palmquist et al.). See also, for example, U.S. Pat. Nos. 3,551,025 (Bingham et al.), 3,795,435 (Schwab), 4,664,966 (Bailey et al.), 4,530,859 (Grunzinger, Jr.), 4,721,649 (Belisle et al.), 4,725,494 (Belisle et al.), and 4,808,471 (Grunzinger).

Certain of the bead bond layers described in these patents are tacky prior to final cure when the optical elements are applied and set, whereas others are nontacky. Some of the layers, including the bead bond layers, are made of polyurethanes, which may or may not be crosslinked. Such sheeting has been sold commercially for many years in large volume and to the general satisfaction of its users. Despite this general satisfaction, there has been a desire for an improvement in certain properties of the sheeting as technology advances and as decentralized manufacturing expands. For example, it is desired to produce retroreflective sheeting which has greater conformability and embossability, particularly under high speed embossing forces, than retroreflective sheeting heretofore known in the art.

SUMMARY OF THE INVENTION

The present invention provides a conformable retroreflective sheeting that will not significantly crack under deformation, particularly high speed embossing conditions. Specifically, the present invention provides a retroreflective sheeting comprising: optical elements arranged in substantially a monolayer; a spacing layer in which the optical elements are at least partially embedded; a specularly reflecting layer underlying the spacing layer; and a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C.

Preferably, the present invention provides a retroreflective sheeting comprising: optical elements arranged in substantially a monolayer; a spacing layer in which the optical elements are at least partially embedded; a specularly reflecting layer underlying the spacing layer; a bead bond layer in which the optical elements are at least partially embedded; wherein the bead bond layer comprises an aminoplast-crosslinked polymer prepared from a polyester polyol and a polyisocyanate, wherein prior to crosslinking the polymer has a glass transition temperature (Tg) of less than about 0° C.; and a thermoplastic top film disposed on the surface of the bead bond layer opposite the optical elements. Preferably and desirably, the sheeting of the present invention (including a top film) has a high speed impact resistance of at least about 0.69 Kg·m when adhesively bonded to a 0.8 mm thick aluminum panel.

The present invention also provides an article comprising a substrate supporting a retroreflective sheeting, wherein the retroreflective sheeting comprises: optical elements arranged in substantially a monolayer; a spacing layer in which the optical elements are at least partially embedded; a specularly reflecting layer underlying the spacing layer; a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C.; and a layer of adhesive. Preferably, the layer of adhesive is disposed on the surface of the specularly reflecting layer opposite the spacing layer.

Finally, a method for preparing retroreflective sheeting is provided. The method comprises: applying a layer of an uncured bead bond composition onto a release liner, the bead bond composition comprising a crosslinking agent and a crosslinkable polymer comprising urethane groups and unprotected functional groups, wherein the crosslinkable polymer has a glass transition temperature (Tg) of less than about 0° C.; depositing optical elements onto the layer of uncured bead bond composition; heating the uncured bead bond composition to a temperature and for a time effective to crosslink the polymer; covering the exposed portions of the optical elements with a spacing layer such that the spacing layer forms an exterior surface cupped around the optical elements; and applying a specularly reflective layer to the cupped surface of the spacing layer.

BRIEF DESCRIPTION OF THE DRAWINGS

FIG. 1 is a top plan view of a license plate having an embedded lens retroreflective sheeting thereon, according to the present invention.

FIG. 2 is a side elevational view of the license plate shown in FIG. 1.

FIG. 3 is a cross sectional view of an alternative embodiment of a license plate with a raised rim.

FIG. 4 is an enlarged, fragmentary, cross sectional view of a portion of a substrate having an embedded lens retroreflective coating thereon.

DETAILED DESCRIPTION

The present invention provides a conformable retroreflective sheeting that will not significantly crack under deformation. Thus, this sheeting can be applied to a substrate made of, for example, a metal such as aluminum or a plastic, and then embossed to make license plates, for example. This sheeting preferably has the advantageous properties of: (1) withstanding high speed embossing forces without significant cracking; (2) withstanding deformation without significantly lifting from the substrate around the deformed areas; and (3) not requiring heat during the application process. The sheeting is also capable of having graphic print under and/or on a protective top film. Although the sheeting is particularly useful for embossed articles, it can be used on nonembossed articles, which can have smooth or irregular surfaces, such as signage or the side of a car or truck.

The desire to emboss license plates under various conditions has surfaced. In locations where the application of the sheeting is not centralized, the application equipment varies. Therefore, a sheeting that withstands various embossing conditions is desired. Typical embossing depths range from about 1.0 mm to about 2.0 mm and embossing speeds can vary from instantaneously to about five seconds. The faster the embossing speed, the more flexible the sheeting needs to be, which can be accomplished by a lower Tg material in the bead bond layer, as used in the sheeting of the present ivention.

Furthermore, after embossing, the raised characters are typically inked, and then the construction may or may not be subjected to elevated temperatures. The elevated temperatures dry the ink and relax the sheeting around the characters. If the constructions are not subjected to elevated temperatures, however, the sheeting needs to be able to relax around the characters without the application of heat. Thus, the bead bond layer of the present invention provides a sheeting capable of being used in either situation (i.e., with or without the application of heat).

The bead bond layer of the present invention also provides a sheeting (including a top film) that preferably has a high speed impact resistance of at least about 0.69 Kg·m, and more preferably at least about 0.92 Kg·m, on a 0.8 mm thick aluminum panel. As used herein, "high speed" impact resistance refers to the amount of force used to deform the sheeting and aluminum panel with a free-falling weight without significant cracking of the sheeting. Typically, using a free-falling weight, the deformation occurs in less than about one second. Preferably, the embossing depth that occurs under such high speed conditions is at least about 2.0 mm, and more preferably at least about 2.25 mm without significant cracking of the sheeting of the present invention.

The reference numeral 1, FIGS. 1–2, generally designates a license plate having a retroreflective sheeting, including a bead bond according to the present invention, thereon. The license plate 1 generally comprises a substrate 3, formed from metal or plastic, for example, having characters 4 embossed therein. The characters 4 are generally embossed such that they are raised (i.e., projected outwardly) from surface 5 of license plate 1; that is, they project toward the viewer. This will be better understood by reference to FIG. 2. Typically, conventional embossed license plates carry characters thereon which are embossed, relative to surface 5 of substrate 3, a total of at least about 0.15–0.20 cm. It is noted that license plate 1 includes an outer border 6 debossed away from the viewer. Alternatively, referring to FIG. 3, the license plate 1' may include a raised rim 7' near the outer border 6' of substrate 3'. The raised rim 7' may or may not be embossed to the same height of the raised characters 4'. Although the present invention is primarily described with respect to applications concerned with embossed letters, numbers, symbols, rims, etc., it will be understood that similar concerns and problems are involved when debossed letters, numbers, symbols, rims, etc., are involved.

In general, it is desirable that at least portions of surface 5 be substantially reflective, so that the license plate 1 will be very conspicuous, even at night and when viewed from a considerable distance. In general it is desirable to provide a license plate 1 which is very strongly retroreflective, so that it can be seen from a considerable distance, with only a small amount of light directed thereon. Further, an embedded lens arrangement is useful at least in part because good reflection is obtained under both wet and dry conditions.

In general, what is needed is a retroreflective sheeting at surface 5 of license plate 1. A commonly used type of such a sheeting is an embedded lens retroreflective sheeting, which can be readily applied to, or laminated on, surface 5, which can then be embossed or debossed to provide the desired letters, symbols, numbers, etc.

Referring to FIG. 4, an embedded-lens retroreflective sheeting utilizing the particular polymeric bead bond layer 14 is depicted. The structure of the sheeting 10 includes a top film 12, which typically forms the exterior front surface of the sheeting; a monolayer of optical elements 13, typically light transmissible glass beads, embedded in a bead bond layer 14, which is also preferably light transmissible; a spacing layer 15, which is preferably light transmissible, applied to the back surfaces of the optical elements 13 in such a way as to follow the curved surface of the back of the optical elements; a specularly reflective layer 16 typically vapor-deposited on the spacing layer 15; and a layer of adhesive 17 covering the reflective layer 16, although a layer of adhesive could alternatively cover the bead bond layer 14 instead of the top film 12. Optional prime layers 18 and 19 can also be used. Prime layer 18 provides enhanced adhesion, for example, to decals or other adhesive-backed materials, as well as inks or other colorants that are applied to the top film 12 of the sheeting. Prime layer 19 provides enhanced adhesion of the top film 12 to the bead bond layer 14. Optional prime layers 18 and 19 are also preferably light transmissible. As used herein, light transmissible means that the material is able to transmit at least about 70% of the intensity of the light incident upon it at a given wavelength. Preferably, the light transmissible materials transmit greater than about 80%, and more preferably, greater than about 90% of the incident light at a given wavelength.

Light rays incident on the sheeting travel through layers 12 and 14, and optional layers 18 and 19, to the optical elements 13, which act as lenses focusing the incident light through the spacing layer 15 and approximately onto the appropriately spaced specularly reflective layer 16. Thereupon the light rays are reflected back out of the sheeting along substantially the same path as they traveled to the sheeting.

Except for the particular bead bond layer 14, the structure shown in FIG. 4 is conventional, and methods for its formation are well known in the art.

Polymeric Bead Bond Layer

Bead bond layer 14 contributes to the illustrated retroreflective sheeting, in that it is the unique characteristics of this layer which enable the sheeting to possess improved conformability and embossability, particularly under high speed embossing forces. It comprises a conformable and embossable polymeric material, which is preferably light transmissible, that provides good adhesion to the optical elements (e.g., microspheres or beads). The optical elements are typically embedded sufficiently deep in the bead bond layer that they are securely anchored; however, they are not embedded so deep that the brightness or angularity of the sheeting is reduced. Typically, the optical elements are embedded to a depth of about 30–50% of their diameter.

The polymeric material used to prepare the bead bond layer 14 is crosslinkable and can form a film with a thickness that can be readily and precisely controlled. The crosslinkable polymer is a polyurethane. That is, the polymer comprises urethane groups (—NH—C(O)—O—), although other groups may also be present such as urea groups (—NH—C(O)—NH—), for example. Preferably, the number average molecular weight of the crosslinkable polyurethane is less than about 30,000, and the weight average molecular weight is less than about 75,000, as determined by Gel Permeation Chromatography.

This polymeric material is a crosslinkable polyurethane having a glass transition temperature (Tg) of less than about 0° C., preferably less than about −5° C., and more preferably within a range of about −5° C. to about −25° C. This low Tg crosslinkable polyurethane is sufficiently compliant such that upon crosslinking, it has a suitable elongation and tensile strength to provide a sheeting that can withstand high speed embossing forces without detrimentally impacting the sheeting. Typically, the addition of optical elements lowers the elongation of free-standing bead bond samples (i.e., layers of cured bead bond that are not supported by a substrate). This is because each bead acts as a fault point from which a crack can propagate. Significantly, this effect is not typically observed with the low Tg polyurethanes used in the bead bond layer of the present invention. Preferably, free-standing bead bond samples of the present invention with a monolayer of optical elements has an elongation of at least about 100%, preferably about 200–1000%. Also, significantly, the low Tg polyurethanes used in the bead bond layer of the present invention provide a more impact resistant bead bond layer. Preferably, a bead bond sample of the present invention adhesively applied to a 0.8 mm thick aluminum panel has a high speed impact resistance (as defined above) of at least about 0.92 Kg·m, and more preferably at least about 1.6 Kg·m.

The polyurethane can be any of a variety of crosslinkable polyurethanes prepared by combining one or more polyols with one or more polyisocyanates as long as the Tg is less than about 0° C. prior to crosslinking. As used herein, crosslinkable means that the polymer has functional groups capable of reacting with a crosslinking agent. Preferably, the polyurethane has pendant hydroxyl groups free for reaction with a crosslinking agent, although other functional groups are possible for crosslinking, such as isocyanate groups and carboxyl groups. In the method of the present invention, the functional groups are unprotected (i.e., unblocked), allowing crosslinking to occur.

A variety of polyols may be utilized in preparing the polyurethane. Also, mixtures of polyols can be used. The term "polyol" as used herein refers to polyhydric alcohols containing two or more hydroxyl groups. The polyol preferably has a hydroxyl functionality of 2–4 (i.e., diols, triols, tetraols). More preferably, the polyol is a diol, although higher functional polyols, such as triols and tetrols, can be used in combination with a diol. Most preferably, the polyol is a diol or mixture of diols and no higher functional polyols are used to prepare the polyurethane.

The polyol can be a polyether polyol such as polytetramethylene glycol and polypropylene glycol; a polyester polyol such as the reaction product of adipic acid and neopentyl glycol or phthalic anhydride and hexanediol; an acrylic polyol; and the like. Preferably, the polyol is a polyester polyol.

A particularly preferred polyester polyol is a hydroxyl terminated polyol of the following formula: HO—[—R—O—C(O)—R'—C(O)—O—R—O—]$_n$—H, wherein R is an aliphatic group having 2–10 carbon atoms, R' is an aliphatic or aromatic group having up to 14 carbon atoms, and n is at least 2. This polyester diol is typically formed from one or more types of aliphatic or aromatic acids/esters and one or more types of aliphatic diols. For example, a polyester diol of the above formula can be prepared from an aromatic acid or ester such as isophthalic acid or dimethyl isophthalate (or mixture thereof), and a diol such as neopentyl glycol, 1,6-hexanediol, or 1,4-cyclohexane dimethanol (or mixture thereof). If both an aromatic and an aliphatic material are used, the weight percent of the aromatic material is generally less than that of the aliphatic material.

The polyester diol, or other suitable polyol, preferably has a hydroxyl equivalent weight of about 90 to about 5000, more preferably about 200 to about 3000, and most preferably about 250–2000. The polyester diol, or other suitable polyol, preferably has an acid number of no greater than about 1.0, and more preferably no greater than about 0.7. Acid number can be determined in accordance with ASTM D 4662-93.

An example of a commercially available polyester diol is FOMREZ 8056-146 from Witco Corp., Melrose Park, Ill. This resin is believed to contain neopentyl glycol at approximately 26 wt-%, 1,6-hexanediol at approximately 29 wt-%, adipic acid/ester at approximately 33 wt-%, and isophthalic acid/ester at approximately 12 wt-%. Other polyester diols are commercially available under the trade designations FOMREZ 55-112 (believed to contain approximately 47 wt-% neopentyl glycol and approximately 53% adipic acid/ester) and FOMREZ 8066-120 (believed to contain approximately 49 wt-% hexanediol, approximately 33 wt-% adipic acid/ester, and approximately 18 wt-% isophthalic acid/ester) from Witco Corp, as well as LEXOREZ from Inolex Chemical Company, Philadelphia, Pa., and RUCOFLEX from Ruco Polymer Corp., Hicksville, N.Y. It should be understood that blends or mixtures of such diols can be used in preparation of the polyurethane used in the bead bond layer 14.

A variety of triols may be utilized in the preparing the polyurethane. Suitable triols include, but are not limited to, polyether triols such as polypropylene oxide triol, polyester triols other than polycaprolactone triols, and simple triols such as trimethylolpropane and glycerol, and mixtures thereof. Preferably the hydroxyl groups in the triol are primary in order to facilitate crosslinking of the resultant polymer. Examples of triols include those commercially available under the trade designations FOMREZ 1066 (trimethylolpropane, hexanediol, and adipate) from Witco Corp., TONE 0305 (a polycaprolactone triol) from Union Carbide Corp., New Milford, Conn., and RUCOFLEX F-2311 from Ruco Polymer Corp. It should be understood that these materials could be used as blends or mixtures with other polyols to achieve a Tg of less than about 0° C.

Tetrafunctional or higher alcohols such as pentaerythritol may also be useful polyols. Other useful polyols are taught by E. N. Doyle in "The Development and Use of Polyurethane Products," McGraw-Hill, 1971. If a triol and higher functional polyol is used, the NCO:OH stoichiometry will need to be adjusted accordingly, although this would be understood by one of skill in the art.

A wide variety of polyisocyanates may be utilized in preparing the polyurethane. "Polyisocyanate" means any organic compound that has two or more reactive isocyanate (—NCO) groups in a single molecule that can be aliphatic, alicyclic, aromatic, or a combination thereof. This definition includes diisocyanates, triisocyanates, tetraisocyanates, and mixtures thereof. Preferably, diisocyanates are utilized. These isocyanate groups can be bonded to aromatic or cycloaliphatic groups. Most preferably aliphatic isocyanates, including cycloaliphatic isocyanates, are used to improve weathering and eliminate yellowing. Useful diisocyanates include, but are not limited to, those selected from the group consisting of bis(4-isocyanotocyclohexyl) methane (H$_{12}$MDI, available from Bayer Corp., Pittsburgh, Pa.), diphenylmethane diisocyanate (MDI, available from Bayer Corp., Pittsburgh, Pa.), isophorone diisocyanate (IPDI, available from Huels America, Piscataway, N.J.), toluene 2,4-diisocyanate (TDI, available from Aldrich Chemical Co., Milwaukee, Wis.), hexamethylene diisocyanate (HDI, available from Aldrich Chemical Co., Milwaukee, Wis.), m-tetramethylxylene diisocyanate (TMXDI, available from Aldrich Chemical Co., Milwaukee, Wis.), and 1,3-phenylene diisocyanate. It is also noted that mixtures of diisocyanates can also be used.

The stoichiometry of the polyurethane reaction is based on a ratio of equivalents of isocyanate to equivalents of polyol. The overall preferred NCO:OH ratio for the polyurethane is less than 1:1 to allow for residual hydroxyl groups in the resultant polyurethane. More preferably, the NCO:OH ratio is about 0.8–0.99 to 1. Most preferably, the NCO:OH ratio is about 0.91–0.96 to 1. It will be understood by one of skill in the art that this ratio will vary depending upon the synthetic sequence when using triol(s) and/or tetrol(s). This is accomplished typically by varying the amount of isocyanate such that gellation is avoided and a soluble product is obtained.

A catalyst may be added to the reaction mixture of polyol(s) and polyisocyanate(s) to promote the reaction. Catalysts for reacting polyisocyanate and active hydrogen containing compounds are well known in the art. See, for example, U.S. Pat. No. 4,495,061 (Mayer et al.). Preferred catalysts include organometallic compounds and amines. The organometallic compounds may be organotin compounds such as dimethyltin dilaurate, dibutyltin dilaurate, and dibutyltin dimercaptide. The preferred catalyst is dibutyltin dilaurate. The catalyst is used in an amount effective to promote the reaction. Preferably, it is used in an amount of about 0.01–2% by weight (wt-%), based on the total weight of solids. More preferably, the catalyst is used in an amount of about 0.01–0.03 wt-% based on solids.

The polymer may be prepared in the presence or absence of a solvent. Preferably, it is prepared in the presence of one or more organic solvents. Examples of suitable solvents include, but are not limited to, amyl acetate, aromatic hydrocarbons and mixtures thereof, butanone, butoxy ethoxyethyl acetate, 2-ethoxyethyl acetate, cyclohexanone, dioxane, 4-methyl-2-pentanone, tetrahydrofuran, toluene, xylene, and/or mixtures thereof. Preferred solvents are xylene, 4-methyl-2-pentanone, and mixtures thereof. The polyurethane reaction mixture preferably includes about 30–75 wt-% total solids, and more preferably about 40–55 wt-% total solids.

An extensive description of some of the useful techniques for preparing polyurethanes can be found in J. H. Saunders and K. C. Frisch, "Polyurethanes: Chemistry and Technology," Part II, Interscience (New York 1964), pages 8–49, and in the various references cited therein. The component polyol(s) and polyisocyanate(s) may be reacted simultaneously or stepwise.

The bead bond layer comprises a crosslinked polyurethane prepared from a crosslinkable polyurethane and a crosslinking agent. A variety of crosslinking agents may be used with the crosslinkable polyurethane of the present invention. In general, what is required is a crosslinking agent that will readily react with the reactive moieties of the polyurethane, which are preferably hydroxyl groups, and which will provide for a substantial amount of crosslinking. The crosslinking agent is at least difunctional. Preferably, it will react at relatively low temperatures (e.g., 90–180° C.), but not at room temperature (i.e., 25–30° C.), although this is not required if in-line mixing is used (i.e., if the crosslinking agent and crosslinkable polyurethane are combined during the manufacturing process immediately prior to coating). Thus, a storage stable composition may be prepared with both the crosslinkable polyurethane and the crosslinking agent therein without having to protect the crosslinkable moieties of the polyurethane.

It is further preferred that the crosslinking agent be such that reaction with the crosslinkable polyurethane can be efficiently carried out to substantial completion in a relatively short period of time, often in less than about three minutes. As used herein "completion" means that the polyurethane cures to a stage whereat relatively little further reaction causing change in volume or conformation will occur. That is, the polyurethane is cured to greater than about 50% gel fraction, and preferably greater than about 80% gel fraction. Thus, advantageously and preferably, the crosslinkable polyurethane includes unprotected functional groups, preferably hydroxyl groups, and can be cured upon crosslinking in a relatively short amount of time at a relatively low temperature.

Preferably, the crosslinkable polyurethane is provided in substantial excess relative to the crosslinking agent. Typically, polyurethane resin to crosslinker ratios (based on solids) vary from about 2:1 to about 20:1 depending on the crosslinker. Preferably, the polyurethane resin to crosslinker ratio is about 5:1 to about 6.5:1.

The crosslinking agents that exhibit the above, preferred, qualities include: aminoplast resins (i.e., the reaction product of an aldehyde and an amine or urea) such as urea-formaldehyde resins, melamine-formaldehyde resins, glycouril-formaldehyde resins; acrylic copolymers containing etherified adducts of the reaction product of acrylamide and formaldehyde; polyfunctional aziridines; epoxy resins; aldehydes; azlactones; and/or any other polyfunctional material whose functional groups are reactive with the functional groups of the crosslinkable polyurethane. Aminoplast resins are preferred, and melamine-formaldehyde resins are particularly preferred. Although the inventors do not wish to be held to any theory, it is believed that these resins contribute to the high impact resistance of the crosslinked polyurethane and weatherability in the bead bond layer. Examples of commercially available melamine-formaldehyde resins are the at least partially butylated melamine-formaldehyde resins available under the trade designations RESIMENE 881, RESIMENE BM 5901, RESIMENE 750, and RESIMENE 7512 from Monsanto, St. Louis, Mo., as well as URAMEX CP 1132 MF from Dutch State Mine Resins, The Netherlands. Other suppliers of melamine-formaldehyde resins are described in Table 2 at page 136 of *Ullmann's Encyclopedia of Industrial Chemistry*, Fifth, Completely Revised Ed., Volume A2, VCH Publishers. As used herein, resin refers to mixtures of monomer, oligomers, and/or polymers.

Additionally, weathering additives such as UV absorbers, hindered amine light stabilizers, antioxidants, etc., can be added to the bead bond to improve the overall durability of the retroreflective sheeting of the present invention.

Top Film

The top film 12 is typically an abrasion resistant, polymer coating that provides a hard, weatherproof exterior to the retroreflective sheet. The top film 12 is preferably made of a light transmissible polymeric material that is substantially thermoplastic and nonelastomeric, and more preferably extrudable. Examples of suitable such materials include polyethylene, or preferably, one or more copolymers of monomers comprising by weight a major portion of at least one of ethylene or propylene, and a minor portion of at least one polar monomer (e.g., a monomer that contains an oxygen or a nitrogen, or combination thereof). Examples of suitable such polar monomers include acrylic acid, methacrylic acid, ethyl acrylate, and vinyl acetate. Alternatively, the top film can be made of a blend of a major amount by weight of one or more of these ethylene- or propylene-containing copolymers with polyethylene and/or other polymers such as vinyl acetate and/or methacrylic acid polymers or copolymers. The melt index of the polymeric material suitable for preparation of the top film is typically less than about 500, preferably less than about 150, and more preferably less than about 20. Polymeric materials having lower melt indices are typically easier to extrude and more resistant to softening at elevated temperatures.

A number of suitable polymers are commercially available, including those available under the trade designations PRIMACOR 3440 (copolymer of ethylene with 9 wt-% acrylic acid, melt index=10) from Dow Chemical Co., Midland, Mich., as well as NUCREI 035 (containing 20 wt-% methacrylic acid, melt index=35), ELVAX 230 (containing 28 wt-% vinyl acetate), and SURLYN 1706 (containing methacrylic acid) from E. I. duPont de Nemours, Wilmington, Del. Each of these polymers has excellent flexibility, strength, and toughness at temperatures as low as −40° C.

The top film 12 is preferably preformed, such as by extrusion or solvent casting, and then adhered to the bead bond layer 14 by a variety of techniques, such as heat lamination, or priming by known surface modification treatments such as corona treatment and/or with an added layer of a chemical prime, etc. Alternatively, the top film 12 can be formed directly on the bead bond layer 14, either by extrusion or solvent casting, although extrusion is preferred. Typically, the top film 12 is about 0.025–0.05 mm thick, and preferably, about 0.031–0.036 mm thick.

Prime Layers

As stated above, the top film 12 and/or the bead bond layer 14 can be primed, e.g., by corona treatment and/or with an added layer of a chemical prime, to improve the adhesion therebetween, even if the top film and bead bond layer are of different polymer families. Also, the top film 12 can be primed to improve the adhesion of inks, other colorants, decals, other adhesive-backed materials, etc., to the outer surface of the retroreflective sheeting. Such priming treatments are generally known to one of skill in the art.

For example, aziridine can be added to urethane-based prime layers that are applied as the inner surface of an olefin-based top film to provide good adhesion and surface receptivity to a urethane-based bead bond layer. The aziridine-containing prime layer adheres well to the olefin-based top film and provides a receptive surface to which the urethane-based bead bond would not typically adhere well, thereby providing the desired high adhesion between the top film and the bead bond layer.

Optical elements

Optical elements 13 are typically in the form of glass beads (also referred to as microspheres or microsphere lenses) that are preferably light transmissible. For the embedded-lens retroreflective sheeting of the present invention, the refractive index of the optical elements is preferably about 2.2–2.3, and is more preferably about 2.23.

Generally, the optical elements do not exceed about 200 microns in diameter. Preferably, the optical elements are about 20–120 microns in diameter, and more preferably about 60–90 microns in diameter. The narrower the range of diameters, the more uniform and better the properties of the sheeting. The preferred size distribution from the mean diameter should be plus or minus 10 microns. The most preferred size distribution from the mean diameter is plus or minus 7.5 microns.

Chemical treatment of bead surfaces, such as with an organochromium compound, may be utilized as known in the art to enhance resin to glass adhesion. Additionally, fluorocarbon treatment of the glass beads can aid in achieving hemispherical bead sinkage and obtaining uniform bead sinkage, as disclosed in U.S. Pat. No. 3,222,204 (Weber et al.).

Reflective Layer

As illustrated in FIG. 4, reflective layer 16 underlies the spacing layer 15. Suitable underlying reflecting means include uniformly-thick metallic deposits such as silver, aluminum, etc. However, instead of forming the reflective layer from metal, dielectric coatings taught in U.S. Pat. No. 3,700,305 (Bingham), can be used. The thickness of reflective layer 16 depends upon the particular metal used and is preferably about 80–100 nm. As an alternative to providing a separate reflective layer 16, specularly reflective or pearlescent pigment may be added to a layer such as the adhesive layer 17.

Spacing Layer

The spacing layer 15 is typically formed from a polymeric material of a suitable rheology to form a coating that follows the curved surface of the back of the optical elements. Typically, this requires a polymer having a weight average molecular weight of greater than about 30,000, and often greater than about 50,000. Spacing layer 15 preferably includes a crosslinked polymeric material, and more preferably a blend of a crosslinked reactive polymer for dimensional stability and a nonreactive, extractable, plasticising polymer. Examples of the reactive polymer include polyvinylacetals, acrylic copolymers, polyurethanes, polyesters, polyamides, polyester-amides, and acrylic block and graft copolymers. Examples of crosslinkers include at least difunctional materials that react with the reactive polymer, which can include other crosslinking polymers, such as aminoplast resins, including urea-formaldehyde resins, melamine-formaldehyde resins, and glycouril-formaldehyde resins; epoxy resins; isocyanates; aldehydes; polyfunctional aziridines; and azlactones. Examples of the nonreactive, extractable, plasticising polymer include polyesters, polyethers, polyamides, polyurethanes, and polymers of certain ethylenically unsaturated monomers. Preferred such spacing layers include aminoplast crosslinked resins such as polyvinyl butyral, acrylic resins, or polyester resins. Examples of these preferred spacing layers are disclosed in, for example, U.S. Pat. No. 5,262,225 (Wilson et al.). It should be understood, however, that other materials can be used in the spacing layer of the retroreflective sheeting of the present invention.

A preferred spacing layer 15 comprises a polyvinyl butyral crosslinked with a urea-formaldehyde crosslinking agent blended with a polyester plasticizer. A suitable polyvinyl butyral includes that available under the trade designation BUTVAR B-76 (a random copolymer of vinyl alcohol, vinyl butyral, and vinyl acetate) from Monsanto, St. Louis, Mo. A suitable urea-formaldehyde crosslinking resin is that available under the trade designation BECKAMINE 21-510 from Reichold Chemicals, Research Triangle Park, N.C. A suitable polyester plasticizer is that available under the trade designation AROPLAZ 1351 from Reichold Chemicals. Preferably, the polyvinyl butyral is used in an amount of about 55–70 wt-%, the urea-formaldehyde resin is used in an amount of about 10–35 wt-%, and the polyester plasticizer is used in an amount of about 5–20 wt-%. These values are weight percents of solids, based on the total solids content of the composition.

The thickness of the spacing layer 15 typically depends on the ratio of the index of refraction of the optical elements to the index of refraction of the top film 12, the bead bond layer 15, and the diameter of the optical elements 13. The spacing layer must be sufficiently thick so as to position the specularly reflective layer 16 at the approximate focal plane for light rays passing through the optical elements. In some cases, through an appropriate combination of high-index optical elements and low index top film layer, no spacing layer is needed, and a specularly reflective layer may be applied directly to the optical elements. However, a spacing layer 15 is normally present, and is generally between about 0.005 and 0.035 mm thick.

Adhesive Layer

Adhesive layer 17 can be either a pressure sensitive or a heat or solvent-activated adhesive. Preferably, adhesive 17 is a pressure-sensitive adhesive, between about 0.01 mm and about 0.06 mm thick. The adhesive is generally coated from solution on a silicone release-coated paper backing (not shown in FIG. 4), dried, and then laminated to reflective layer 16 (or bead bond layer 14). Alternatively, the adhesive may be applied directly to the reflective layer 16 (or the bead bond layer 14) and the release-treated paper backing laminated to the adhesive layer 17, to complete the retroreflective product.

Preferably, the pressure sensitive adhesive is an acrylic-based adhesive. Suitable acrylic polymers that can be used to prepare the pressure sensitive adhesive include those formed by polymerizing polar monomers with acrylic monomers. Suitable acrylic monomers include ($C_4$–$C_{12}$)alkyl acrylate monomers and ($C_6$–$C_{12}$)alkyl methacrylate monomers, such as, for example, isooctyl acrylate, butyl acrylate, 2-ethyl hexyl acrylate, 2-ethyl hexyl methacrylate, octyl acrylate, octyl methacrylate, and mixtures thereof. Suitable polar monomers include acidic monomers such as ethylenically unsaturated carboxylic acids, ethylenically unsaturated sulfonic acids, and ethylenically unsaturated phosphoric acids. Specific examples include acrylic acid, methacrylic acid, itaconic acid, styrene sulfonic acid, maleic acid, fumaric acid, crotonic acid, citraconic acid, beta-carboxyethyl acrylate, sulfoethyl methacrylate, and mixtures thereof. The acrylic and polar monomers typically are present in a weight percent ratio of about 87.5–95 acrylic monomers to 5–12.5 polar monomers.

The acrylic-based adhesive is preferably crosslinked using a crosslinking agent that is chosen depending on the monomers employed. Acrylic pressure sensitive adhesives can be crosslinked using radiation (e.g., electron beam, ultraviolet, etc.), moisture, or heat. Bisamide crosslinking agents are examples of a thermal crosslinking agent that utilizes heat to provide a chemical crosslink.

Colorants or Graphics

Retroreflective sheeting made according to the method of the present invention returns the most incident light to the source when the top film 12, bead bond layer 14, and spacing layer 15 are uncolored and clear, in which case the sheeting will generally have a silver or gray appearance caused by the metallic appearance of the reflective layer 16. However, colored sheeting can be prepared by placing dyes or pigments, which are preferably light transmissible, in the spacing layer 15, bead bond layer 14, top film 12, and/or optional prime layers 18 and 19. Alternatively, images, such as graphics, can be applied to the bead bond layer 14 before the top film 14 is applied, or they can be applied to either major surface (i.e., inner or outer surface) of the top film 14. When images are embedded within the sheeting, the images are generally more durable. Images can also be formed in the reflective layer 16 through the use of lasers as disclosed in U.S. Pat. Nos. 4,634,220 (Hockert et al.) and 4,688,894 (Hockert).

Method of Preparing Embedded Lens Sheeting

A preferred procedure for making the embedded-lens structure of FIG. 1 comprises the steps of:

(1) preparing a crosslinkable polymer comprising urethane groups, preferably a crosslinkable polymer comprising urethane groups and unprotected functional groups, and more preferably a hydroxyl-terminated polyurethane, for the bead bond layer;

(2) applying a layer of a mixture of the crosslinkable polymer and a crosslinking agent onto a smooth-surfaced release liner, such as an acrylic-coated release liner and optionally heating this to a temperature of about 45°–90° C. to flash off any solvent used to prepare the polyurethane;

(3) applying a monolayer of optical elements 13 to the uncured bead bond layer 14;

(4) applying slight pressure to the optical elements to aid resin capillation and embed the lenses in the bead bond layer to about 30–50% of their diameter and then thermally curing the bead bond layer 14 by heating to a temperature of about 90°–180° C., preferably about 140°–175° C.;

(5) covering the exposed portions of the optical elements 13 with spacing layer 15 having an exterior surface cupped around the optical elements;

(6) applying the specularly reflective layer 16 to the cupped surface of the spacing layer 15, typically by vapor-deposition techniques;

(7) stripping away the release liner from the bead bond layer 14;

(8) applying, in typical embodiments, the adhesive layer 17 over the specularly reflective layer 16;

(9) optionally, corona treating and/or applying a prime layer to the bead bond surface; and

(10) applying a top film 12 to the top surface of the retroreflective film.

It may be desired in some instances to apply a priming layer to the outside surface of the top film 12, such a layer being receptive to the application of marking compositions, e.g., inks, to enable the application of legends to the face of a retroreflective sheeting. Such a priming layer is preferably light transmissible. An example thereof is a water-borne urethane with an aziridine crosslinker.

The following examples are offered to further illustrate the various specific and preferred embodiments and techniques. It should be understood, however, that many variations and modifications may be made while remaining within the scope of the present invention.

EXAMPLES

The following exemplify preparations of the bead bond polyurethane compositions in accordance with the invention. All parts, percentages, and ratios throughout the specification, including the examples, are by weight unless otherwise indicated. The terms "equivalent weight" or "Eq. Wt." as used herein with respect to a functionality or moiety, refers to the mass of polymer per mole, or equivalent, of the functionality.

Testing

Inherent Viscosity: The inherent viscosity of each composition was measured to provide a relative comparison of the molecular weights. The inherent viscosity was measured by conventional means using a Cannon-Fenske viscometer (available from Jupiter Instrument Company, Jupiter, Fla.) in a water bath controlled at 25° C. to measure the flow time of 10 milliliters of a polymer solution (0.8 grams per deciliters (g/dl) of polymer in tetrahydrofuran solvent) and the flow time of the tetrahydrofuran solvent. In each experiment, inherent viscosity is reported in deciliters per gram.

Glass Transition Temperature: The glass transition temperature (Tg) of the materials of the present invention were determined by differential scanning calorimetry. A small amount of dried film was placed in the DSC chamber of a Perkin-Elmer DSC-7 (Norwalk, Conn.) differential scanning calorimeter under a nitrogen atmosphere. The sample was cooled from room temperature to −100° C. and then heated to 150° C. at a scanning rate of 20° C. per minute, and finally cooled at a rate of 40° C. per minute. The Tg was taken as the midpoint of the curve in the glass transition region (the temperature at which amorphous material changes from a glassy state to a ductile state).

Tensile and Elongation: The tensile strength and total elongation of some of the coatings were tested under ASTM Test Method D882-83 (1986). Results are reported in Table A, below.

Impact Resistance: The impact resistance of bead bond film, bead bond film with beads, and finished sheeting were tested at 25° C. according to ASTM D2794 (1986). The bead bond films and bead bond films with a monolayer of beads were prepared and removed from the acrylic-coated release liners. These "free-standing" films were then laminated to a 0.8 mm thick aluminum alloy 3003-H12 panel using a pressure sensitive adhesive having a 90:10 ratio of isooctyl acrylate-acrylic acid copolymer and radiation cured with an E-beam at 4.0–6.0 Mrads having an inherent viscosity of 0.6–1.0 dl/g prior to crosslinking measured as described above (referred to herein as 90:10 IOA:AA adhesive). Finished retroreflective sheeting was directly laminated to the aluminum using the same adhesive. The panels were impacted on the side of the panels opposite the films or sheetings with a punch having a diameter of 15.9 mm. The test was performed with increasing force to a maximum of 1.6 kg·m. The results are reported in Table B, below.

License Plate Embossibility: With the retroreflective sheeting mounted on an aluminum alloy 3003-H12 panel having a thickness of 0.8 mm, a variable embossing pattern was impressed using male/female dies to form a series of five alphanumeric symbols ($\Omega$) 7.06 cm high and 5.16 cm across and a stroke width of 0.95 cm. The symbols embossed the blank to depths of 1.5 mm, 1.75 mm, 2.0 mm, 2.25 mm, and 2.5 mm. The slope of the edges varied from 0.8 at 1.5 mm to 1.3 at 2.5 mm. The embossing depth was reported, which was the greatest depth of embossing where no visible cracking was evident. Pop-off resistance was reported as the greatest depth of embossing where there was no visible lifting of the sheeting from the areas around the symbols after 24 days. The results are reported in Table B, below.

Top Film Adhesion: Retroreflective sheeting was applied to a 0.8 mm aluminum panel and submerged in boiling water for two minutes. A sharp razor blade was used to carefully start peeling the top film away from the base retroreflective sheeting. Tensile force for peeling the top film away from the base retroreflective sheeting was measured on an INSTRON or SYNTEX tensile testing instrument, pulling the cover film away from the base sheeting at a 180° angle. The results are listed in Table B, below.

Simulated Weathering Resistance: Bead bond films from Example 2 were laminated to a 90:10 IOA:AA pressure sensitive adhesive which had been applied to aluminum. The panels were tested for weatherability in a weathering machine for 500, 1000, and 1500 hours under ASTM Test Method G23, Condition E. The results are listed in Table C, below.

Preparation of Materials

Top Film: A light transmissible top film comprising: 97.4 parts of PRIMACOR 3440 (an extrusion grade, thermoplastic, high molecular weight copolymer believed to comprise a major portion of ethylene monomer and a minor portion of acrylic acid monomer, available from DuPont de Nemours, having a melt flow index of about 10); and 2.6 parts of a stabilizing system (1.0 part of ultraviolet absorber, 1.5 parts of a hindered amine, and 0.1 parts of an antioxidant, the stabilizing system is not believed to affect the strength of the top film or its adhesion to other materials), was extruded as follows. The stabilized copolymer was extruded onto a biaxially-oriented polyethylene terephthalate (PET) carrier using a single-flighted screw with a compression ratio of 3:1 to form a 0.033 mm thick film. The extruder temperatures were ramped up from about 190° C. to about 275° C. The extruder screw speed was 30 rpm while the film takeaway speed was adjusted to provide a film having a desired thickness. The extruded film was wound upon itself into roll form.

Preparation of Polyurethanes for Bead Bond Layer

Polyurethane Preparation 1: The following materials were charged to a one liter three neck round bottom flask: a polyester diol available from Witco Corp., Melrose Park, Ill., under the trade designation FOMREZ 8056-146 (220 grams; 0.560 equivalents) and xylene (440 grams). Because the water content of this diol solution was greater than 500 ppm, a total of 220 grams of xylene was azeotropically distilled to achieve a water content of less than 500 ppm. Bis(4-isocyanotocyclohexyl) methane (67.48 grams; 0.515 equivalents; Bayer Corp., Pittsburgh, Pa.), xylene (67.5 grams) and two drops of dibutyltin dilaurate (Aldrich Chemical Co., Milwaukee, Wis.) were added to the reaction vessel. The reaction was heated under reflux for five hours, then maintained at 110° C. (approximately 12 hours) until there was no free isocyanate observed in the infrared spectrum. The material had an inherent viscosity of 0.44 dl/g when measured in tetrahydrofuran. The calculated hydroxyl equivalent weight was 6418. The Tg was −11.5° C.

Polyurethane Preparation 2: The following materials were charged to a one liter three neck round bottom flask: polyester diols available from Witco Corp. under the trade designations FOMREZ 55-112 (150.07 grams; 0.295 equivalents) and FOMREZ 8066-120 (150.00 grams; 0.326 equivalents), and xylene (381.59 grams). Because the water content of this diol solution was greater than 500 ppm, a total of 153.94 grams of xylene was azeotropically distilled to achieve a water content of less than 500 ppm. Bis(4-isocyanotocyclohexyl) methane (74.93 grams; 0.572 equivalents; Bayer Corp., Pittsburgh, Pa.), xylene (147.5 grams) and three drops of dibutyltin dilaurate were added to the reaction vessel. The reaction was heated under reflux for four hours, then maintained at 110° C. (approximately 12 hours) until there was no free isocyanate observed in the infrared spectrum. The material had an inherent viscosity of 0.40 dl/g when measured in tetrahydrofuran. The calculated hydroxyl equivalent weight was 7539. The Tg was −21.1° C.

Polyurethane Preparation 3: The following materials were charged to a one liter three neck round bottom flask: the polyester diol FOMREZ 8056-146 (283.5 grams; 0.721 equivalents) and 4-methyl-2-pentanone (366 grams). Because the water content of this diol solution was greater than 500 ppm, a total of 306 grams of 4-methyl-2-pentanone was azeotropically distilled and replaced with 306 grams of dry 4-methyl-2-pentanone to achieve a water content of less than 500 ppm. Diphenylmethane diisocyanate (82.97 grams; 0.664 equivalents; Bayer Corp., Pittsburgh, Pa.) and two drops of dibutyltin dilaurate were added to the reaction vessel. The reaction was heated under reflux for ninety minutes until there was no free isocyanate observed in the infrared spectrum. The material had an inherent viscosity of 0.29 dl/g when measured in tetrahydrofuran. The calculated hydroxyl equivalent weight was 6349. The Tg was –12.0° C.

Polyurethane Preparation 4: The following materials were charged to a one liter three neck round bottom flask: the polyester diol FOMREZ 8056-146 (275.00 grams; 0.700 equivalents) and 4-methyl-2-pentanone (550 grams). Because the water content of this diol solution was greater than 500 ppm, a total of 275 grams of 4-methyl-2-pentanone was distilled to achieve a water content of less than 500 ppm. Isophorone diisocyanate (84.35 grams; 0.644 equivalents; Huels America, Piscataway, N.J.), 4-methyl-2-pentanone (85 grams), and two drops of dibutyltin dilaurate were added to the reaction vessel. The reaction was heated under reflux for three hours, then maintained at 105° C. (approximately 14 hours) until there was no free isocyanate observed in the infrared spectrum. The material had an inherent viscosity of 0.29 dl/g when measured in tetrahydrofuran. The calculated hydroxyl equivalent weight was 6418. The Tg was –9.6° C.

Comparative Polyurethane Preparation 1: A polyester polyol extended with $H_{12}$MDI to form a hydroxyl terminated polyurethane (Tg=27° C.), which was prepared from a polyester polyol (Tg=2.6° C.) in a manner described above for Preparation 1.

Example 1

In the lab, the bead bond resin from Preparation 1 was crosslinked with a partially butylated melamine formaldehyde available from DSM Resins, Zwolle, the Netherlands, under the trade designation URAMEX CP 1132 MF at a resin to crosslinker ratio of 4.1:1 (based on solids). The sample was mixed for approximately 5 minutes with an air mixer. The resulting solution was coated to 0.075 mm thick (wet) onto an acrylate-coated paper release liner with a knife coater. Three samples were produced in this manner. The first sample (1A) was air dried for 1 minute, baked at 90° C. for 2 minutes, and then baked at 150° C. for 3 minutes. The thickness of the dry coating was 0.025 mm. The two remaining samples (1B and 1C) were dried for 1 minute, glass beads (60 micron mean diameter with a ±10 micron distribution, surface treated with an organochromium complex and a fluorocarbon) were cascaded over the samples, the samples then were baked at 90° C. and 150° C. for 2 and 3 minutes, respectively, without the application of pressure to embed the beads. Sample 1C was then coated with a spacing layer containing 63 wt-% BUTVAR B-76 polyvinyl butyral (Monsanto, St. Louis, Mo.), 23 wt-% BECKAMINE 21-510 urea-formaldehyde crosslinking resin (Reichold Chemicals, Research Triangle Park, N.C.), and 14 wt-% AROPLAZ 1351 polyester plasticizer (Reichold Chemicals). These weight percentages were based on solids. The spacing layer was then cured at 90° C. and 150° C. for 2 and 3 minutes, respectively, resulting in a dry coating thickness of 0.013 mm. The acrylic release liner was removed from the bead bond surface. The 90:10 IOA:AA pressure sensitive adhesive described above was laminated to the spacing layer. A 0.033 mm thick top film prepared as described above was heated laminated to the bead bond layer of the sheeting.

Example 2 and Comparative Example 1

Several bead bond compositions were prepared with differently butylated melamine-formaldehyde crosslinkers at different polyurethane resin to crosslinker ratios. These may be found in the following table:

| Sple. No. | Poly- urethane Prep. | Amount Resin (g) | % Solids of Resin | Amount Cross- linker[1] (g) | % Solids of Cross- linker | Ratio (Resin to Cross- linker) |
|---|---|---|---|---|---|---|
| 2A | 1 | 100 | 48.5 | 14.26 | 68 | 5 |
| 2B | 1 | 50 | 48.5 | 4.04 | 60 | 10 |
| 2C | 1 | 100 | 48.5 | 2.54 | 95 | 18 |
| 2D | 4 | 45 | 51.3 | 5.22 | 68 | 6.5 |
| 2E | 3 | 45 | 53.1 | 5.41 | 68 | 6.5 |
| 2F | 2 | 45 | 52.3 | 5.32 | 68 | 6.5 |
| 2G | 1 | 40 | 37.3 | 7.06 | 68 | 3.1 |
| Comp. 1 | Comp. 1 | 44.5 | 50 | 5.84 | 68 | 5.6 |

[1]All samples contained a butylated melamine-formaldehyde resin as the crosslinker: Sample 2B contained RESIMENE 881 (partially butylated); Sample 2C contained RESIMENE 7512 (fully butylated); all others contained URAMEX CP 1132 MF (partially butylated).

Each bead bond composition was mixed for approximately 5 minutes with an air mixer. The resulting solution was coated to 0.05 mm thick (wet) onto an acrylic-coated paper release liner with a knife coater. Two samples were produced in this manner for each bead bond composition. The first sample for each was air dried for 1 minute, baked at 90° C. for 2 minutes, and then baked at 150° C. for 3 minutes. The thickness of the dry coating was 0.025 mm. The remaining sample for each composition was air dried for 1 minute and glass beads described in Example 1 were cascaded over the sample, which was then baked in an oven at 90° C. and 150° C. for 2 and 3 minutes, respectively.

Example 3 and Comparative Example 2

The polyurethane resin from Preparation 1 (Sample 3A) and from Comparative Polyurethane Preparation 1 (Comp. 2) were mixed with DSM's URAMEX CP 1132 MF and Monsanto's RESIMENE 881 melamine-formaldehyde crosslinkers, respectively, at a resin to crosslinker ratio of 6.36:1 (based on solids). The solutions were coated with a knife coater onto an acrylic-coated paper release liner, with a resulting coating thickness of about 0.025 mm when dried. A monolayer of glass beads described in Example 1 were applied to the uncured bead bond composition. Samples 3A and Comp. 2 were exposed for 3.3 minutes and 2.3 minutes, respectively, through an oven with an initial temperature of 90° C., which was ramped up to a final temperature of 170° C., using a line speed of 10.7 meters/minute and 15.2 meters/minute, respectively.

Next, a spacing layer as described in Example 1 was applied to the bead bond layer of the sheeting to form a 0.008–0.031 mm thick spacing layer. The space-coated films were exposed for 2.3 minutes through an oven with an initial temperature of 75° C., which was ramped up to a final temperature of 170° C., using a line speed of 15.3 meters/minute.

To the spacing layer, a reflective layer of aluminum metal about 100 nm thick was applied by vapor deposition. The acrylic release liner was then stripped away from the bead bond layer. A 0.038 mm thick layer of the 90:10 IOA:AA adhesive described above was then applied to the reflective layer.

Next, a layer of a priming solution was applied to the top surface of the bead bond layer, which had been corona treated at 0.39 kilowatts/meter/minute. The priming solution included 75.0 parts of a water-borne aliphatic urethane available under the trade designation NEOREZ R960 from Zeneca Resins, Wilmington, Mass., 14.9 parts water, 0.2 parts bubble breaker available under the trade designation WITCO 3056A from Witco Corp., Melrose Park, Ill., 7.5 parts ethyl alcohol, 0.1 part of a fluorocarbon leveling agent available under the trade designation FC-120 from 3M Company, St. Paul, Minn., and 2.3 parts of a 100% active polyfunctional aziridine liquid crosslinker available under the trade designation CX-100 from Zeneca Resins, Wilmington, Mass. applied with a 175 line quadrangular knurl coater. The coating was then dried at 65° C. to yield a priming layer having an approximate dry thickness of 2 microns.

Next, a 0.033 mm thick top film prepared as described above was laminated to the bead bond surface of the retroreflecting base material. Prior to lamination, each surface of the top film was corona treated using the following conditions: 2.4 kw/meter width; surface of hot can, 150° C.; hot can diameter, 61 cm; nip roll hardness, 70 shore A; speed, 15.3 meters/minute; and length of composite heating, 60 cm. The PET carrier film was stripped and the resulting retroreflective sheeting was wound upon itself for storage.

Results

The results of tensile and elongation, impact resistance, embossability, weathering resistance, and top film adhesion are reported in the following tables.

TABLE A

| Example | Tensile at Yield (MPa) | Tensile at Break (MPa) | Elongation (%) | Impact Resistance[1] (Kg-m) |
|---|---|---|---|---|
| 1A | nt | 6.32 | 430 | >1.37 |
| 1B | nt | 0.43 | 710 | >1.37 |
| 1C | nt | nt | nt | >1.37 |
| 2A | 0.73 | 0.67 | 490 | >1.6 |
| 2A with Beads | 1.30 | 0.48 | 536 | >1.6 |

TABLE A-continued

| Example | Tensile at Yield (MPa) | Tensile at Break (MPa) | Elongation (%) | Impact Resistance[1] (Kg-m) |
|---|---|---|---|---|
| 2B | 4.00 | 0.19 | 998 | >1.6 |
| 2B with Beads | 0.88 | 0.66 | 505 | >1.6 |
| 2C with Beads | ** | ** | ** | >1.6 |
| 2D | 1.90 | 1.90 | 217 | >1.6 |
| 2D with Beads | 2.06 | 2.06 | 236 | >1.6 |
| 2E | 0.51 | 0.19 | 999 | >1.6 |
| 2E with Beads | 1.16 | 1.01 | 541 | >1.6 |
| 2F | 0.26 | 0.14 | 1,008 | >1.6 |
| 2F with Beads | 0.89 | 0.86 | 581 | >1.6 |
| 2G | nt | 5.84 | 440 | >1.37 |
| 2G with Beads | 0.75 | 0.29 | 585 | >1.37 |
| Comp. 1 | nt | 58.23 | 5 | <0.46 |
| 3A with Beads | nt | nt | nt | >1.6 |
| 3A Finished Sheeting | nt | nt | nt | 0.91 |
| Comp.2 with Beads | nt | nt | nt | <0.11 |
| Comp.2 Finished Sheeting | nt | nt | nt | <0.23 |

[1]For values listed as >1.37 or >1.6, there was no failure (i.e., no significant cracking) at the maximum force tested.
**Not able to test because not able to strip enough sample from release liner. An alternative release liner could be used to make this sample work.
nt = not tested.

TABLE B

| Example | Slow Speed License Plate Embossibility | Pop-Off Resistance | Top Film Adhesion |
|---|---|---|---|
| 1C | No failure at 2.5 mm | No pop-off of 2.5 mm embossed symbol | nt |
| 3A Finished Sheeting | No failure at 2.5 mm | No pop-off of 2.25 mm embossed symbol | No Separation |
| Comp. 2 Finished Sheeting | Failure at 1.75 mm | nt | No Separation |

The results in Tables A and B demonstrate the high impact resistance and embossibility of the sheeting of the present invention, relative to conventional sheeting. The embossibility is reported as the greatest depth of embossing where no visible cracking was observed. The pop-off resistance is reported as the greatest depth of embossing where there was no visible lifting of the sheeting from the areas around the symbols after 24 days. The results in Table C, below, demonstrate the improved weatherability of the sheeting of the present invention.

TABLE C

| | 500 Hours | | | 1000 Hours | | | 1500 Hours | | |
|---|---|---|---|---|---|---|---|---|---|
| Example | 60° Gloss % Ret. | Crack Size | Color | 60° Gloss % Ret. | Crack Size | Color | 60° Gloss % Ret. | Crack Size | Color |
| 2G | 112.8 | none | clear | 124.8 | none | very pale yellow | 99.7 | none | pale yellow |
| Comp. 1 | 102.0 | none | clear | 97.2 | 1–3 mm | pale yellow | 39.6 | 1 to 3 mm | pale yellow |

All patents, patent documents, and publications cited herein are incorporated by reference as if individually incorporated. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A retroreflective sheeting comprising:
   (a) optical elements arranged in substantially a monolayer;
   (b) a spacing layer in which the optical elements are at least partially embedded;
   (c) a specularly reflecting layer underlying the spacing layer; and
   (d) a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C.;
   wherein the retroreflective sheeting with beads present has a high speed impact resistance of at least about 0.69 Kg·m when adhesively bonded to a 0.8 mm thick aluminum panel.

2. The retroreflective sheeting of claim 1 further comprising a thermoplastic top film disposed on the surface of the bead bond layer opposite the optical elements.

3. The retroreflective sheeting of claim 2 wherein the top film comprises a light transmissible polymeric material comprising polyethylene or one or more copolymers derived from monomers comprising by weight a major portion of at least one of ethylene or propylene, and a minor portion of at least one polar monomer.

4. The retroreflective sheeting of claim 3 wherein the polar monomer is selected from the group consisting of acrylic acid, methacrylic acid, ethyl acrylate, and vinyl acetate.

5. The retroreflective sheeting of claim 2 further comprising a layer of adhesive disposed on the surface of the specularly reflecting layer opposite the spacing layer.

6. The retroreflective sheeting of claim 5 which has a high speed impact resistance of at least about 0.92 Kg·m when adhesively bonded to a 0.8 mm thick aluminum panel.

7. The retroreflective sheeting of claim 1 further comprising a layer of adhesive disposed on the surface of the bead bond layer opposite the optical elements.

8. The retroreflective sheeting of claim 1 wherein the polymer is prepared from a polyester polyol and a polyisocyanate.

9. The retroreflective sheeting of claim 8 wherein the polyester polyol is a hydroxyl-terminated polyester diol.

10. The retroreflective sheeting of claim 1 wherein the aminoplast-crosslinked polymer is prepared from a hydroxyl functional polymer and an aminoplast resin.

11. The retroreflective sheeting of claim 10 wherein the hydroxyl functional polymer is a hydroxyl functional polyester polyurethane.

12. The retroreflective sheeting of claim 10 wherein the aminoplast resin comprises a melamine-formaldehyde resin.

13. The retroreflective sheeting of claim 12 wherein the melamine-formaldehyde resin is at least partially butylated.

14. The retroreflective sheeting of claim 10 wherein the hydroxyl functional polymer is a linear polymer.

15. The retroreflective sheeting of claim 1 wherein prior to crosslinking the polymer has a number average molecular weight of less than about 30,000.

16. A retroreflective sheeting comprising:
    (a) optical elements arranged in substantially a monolayer;
    (b) a spacing layer in which the optical elements are at least partially embedded;
    (c) a specularly reflecting layer underlying the spacing layer;
    (d) a bead bond layer in which the optical elements are at least partially embedded; wherein the bead bond layer comprises an aminoplast-crosslinked polymer prepared from a polyester polyol and a polyisocyanate, wherein prior to crosslinking the polymer has a glass transition temperature (Tg) of less than about 0° C.; and
    (e) a thermoplastic top film disposed on the surface of the bead bond layer opposite the retroreflective elements;
    wherein the retroreflective sheeting with beads present has a high speed impact resistance of at least about 0.69 Kg·m when adhesively bonded to a 0.8 mm thick aluminum panel.

17. The retroreflective sheeting of claim 16 which has a high speed impact resistance of at least about 0.92 Kg·m when adhesively bonded to a 0.8 mm thick aluminum panel.

18. The retroreflective sheeting of claim 16 wherein the polyester polyol is a linear polyester diol.

19. The retroreflective sheeting of claim 16 wherein prior to crosslinking the polymer has a number average molecular weight of less than about 30,000.

20. An article comprising a substrate supporting a retroreflective sheeting, wherein the retroreflective sheeting comprises:
    (a) optical elements arranged in substantially a monolayer;
    (b) a spacing layer in which the optical elements are at least partially embedded;
    (c) a specularly reflecting layer underlying the spacing layer;
    (d) a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C.; and
    (e) a layer of adhesive;
    wherein the retroreflective sheeting with beads present has a high speed impact resistance of at least about 0.69 Kg·m when adhesively bonded to a 0.8 mm thick aluminum panel.

21. The article of claim 20 wherein the layer of adhesive is disposed on the surface of the specularly reflecting layer opposite the spacing layer.

22. The article of claim 20 wherein the layer of adhesive is disposed on the surface of the bead bond layer opposite the optical elements.

23. The article of claim 20 which is embossed.

24. The article of claim 23 which is a license plate wherein the retroreflective sheeting further comprises a top film disposed on the surface of the bead bond layer opposite the optical elements.

25. The article of claim 20 wherein the substrate has an irregular surface.

26. The article of claim 20 further comprising a thermoplastic top film disposed on the surface of the bead bond layer opposite the retroreflective elements.

27. The article of claim 26 wherein the top film comprises a light transmissible polymeric material comprising polyethylene or one or more copolymers derived from monomers comprising by weight a major portion of at least one of ethylene or propylene, and a minor portion of at least one monomer selected from the group consisting of acrylic acid, methacrylic acid, ethyl acrylate, and vinyl acetate.

28. The article of claim 26 wherein the retroreflective sheeting has a high speed impact resistance of at least about 0.92 Kg·m when adhesively bonded to a 0.8 mm thick aluminum panel.

29. The article of claim 20 wherein the polymer is prepared from a polyester polyol and a polyisocyanate.

30. The article of claim 29 wherein the polyester polyol is a hydroxylterminated polyester diol.

31. The article of claim 20 wherein the aminoplast-crosslinked polymer is prepared from a hydroxyl functional polyester polyurethane and an aminoplast resin.

32. The article of claim 31 wherein the aminoplast resin comprises a melamine-formaldehyde resin.

33. The article of claim 32 wherein the melamine-formaldehyde resin is at least partially butylated.

34. A method for preparing retroreflective sheeting comprising:
   (a) applying a layer of an uncured bead bond composition onto a release liner, the bead bond composition comprising an aminoplast crosslinking agent and a crosslinkable polymer comprising urethane groups and unprotected functional groups, wherein the crosslinkable polymer has a glass transition temperature (Tg) of less than about 0° C.;
   (b) depositing optical elements onto the layer of uncured bead bond composition;
   (c) heating the uncured bead bond composition to a temperature and for a time effective to crosslink the polymer;
   (d) covering the exposed portions of the optical elements with a spacing layer such that the spacing layer forms an exterior surface cupped around the optical elements; and
   (e) applying a specularly reflective layer to the cupped surface of the spacing layer;
wherein the retroreflective sheeting with beads present has a high speed impact resistance of at least about 0.69 Kg·m when adhesively bonded to a 0.8 mm thick aluminum panel.

35. The method of claim 34 wherein the step of heating the uncured bead bond composition at a temperature and for a time effective to crosslink the polymer comprises heating the composition at a temperature of about 90°–180° C.

36. The method of claim 34 wherein the unprotected functional groups comprise hydroxyl groups.

37. The method of claim 34 wherein the crosslinkable polymer is prepared from a polyester polyol and a polyisocyanate.

38. The method of claim 37 wherein the polyester polyol is a hydroxyl-terminated polyester diol.

39. The method of claim 38 wherein the crosslinking agent comprises a melamine-formaldehyde resin.

40. A retroreflective sheeting adhered to a substrate, wherein the retroreflective sheeting comprises:
   (a) optical elements arranged in substantially a monolayer;
   (b) a spacing layer in which the optical elements are at least partially embedded;
   (c) a specularly reflecting layer underlying the spacing layer; and
   (d) a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C.;
wherein the retroreflective sheeting with beads present has a high speed impact resistance of at least about 0.69 Kg·m when adhesively bonded to a 0.8 mm thick aluminum panel; and
wherein the sheeting and substrate comprise embossed regions having a depth of at least about 2.0 mm with no significant cracks in the sheeting.

41. A retroreflective sheeting comprising:
   (a) optical elements arranged in substantially a monolayer;
   (b) a spacing layer in which the optical elements are at least partially embedded;
   (c) a specularly reflecting layer underlying the spacing layer; and
   (d) a bead bond layer in which the optical elements are at least partially embedded; wherein the bead bond layer comprises an aminoplast-crosslinked polymer comprising urethane groups, wherein prior to crosslinking the polymer has a glass transition temperature (Tg) of less than about 0° C. and a number average molecular weight of less than about 30,000.

42. A retroreflective sheeting comprising:
   (a) optical elements arranged in substantially a monolayer;
   (b) a spacing layer in which the optical elements are at least partially embedded;
   (c) a specularly reflecting layer underlying the spacing layer; and
   (d) a bead bond layer in which the optical elements are at least partially embedded;
wherein the bead bond layer comprises an aminoplast-crosslinked polymer comprising urethane groups, wherein prior to crosslinking the polymer has a glass transition temperature (Tg) of less than about 0° C. and is prepared from a linear diol and a polyisocyanate.

43. A retroreflective sheeting comprising:
   (a) optical elements arranged in substantially a monolayer;
   (b) a spacing layer in which the optical elements are at least partially embedded;
   (c) a specularly reflecting layer underlying the spacing layer; and
   (d) a bead bond layer in which the optical elements are at least partially embedded; wherein the bead bond layer comprises an aminoplast-crosslinked linear polymer comprising urethane groups, wherein prior to crosslinking the polymer has a glass transition temperature (Tg) of less than about 0° C.

* * * * *